US008913569B2

(12) United States Patent
Castelain et al.

(10) Patent No.: US 8,913,569 B2
(45) Date of Patent: Dec. 16, 2014

(54) METHOD AND A DEVICE FOR DETERMINING A SHIFTING PARAMETER TO BE USED BY A TELECOMMUNICATION DEVICE FOR TRANSFERRING SYMBOLS

(75) Inventors: Damien Castelain, Rennes Cedex (FR); Cristina Ciochina, Rennes Cedex (FR); Loic Brunel, Rennes Cedex (FR); David Mottier, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 83 days.

(21) Appl. No.: 13/255,698

(22) PCT Filed: Mar. 12, 2010

(86) PCT No.: PCT/EP2010/053150
§ 371 (c)(1),
(2), (4) Date: Sep. 9, 2011

(87) PCT Pub. No.: WO2010/105973
PCT Pub. Date: Sep. 23, 2010

(65) Prior Publication Data
US 2012/0002629 A1 Jan. 5, 2012

(30) Foreign Application Priority Data
Mar. 20, 2009 (EP) .................................. 09155717

(51) Int. Cl.
*H04W 72/00* (2009.01)
*H04L 5/00* (2006.01)
*H04L 1/06* (2006.01)
(52) U.S. Cl.
CPC ............ *H04L 5/0023* (2013.01); *H04L 1/0625* (2013.01); *H04L 1/0668* (2013.01)
USPC ....................................................... 370/329
(58) Field of Classification Search
CPC ............................................ H04L 1/06–1/0693
IPC ..................................................... H04L 1/0643
See application file for complete search history.

(56) References Cited

U.S. PATENT DOCUMENTS 7,970,064 B2 * 6/2011 Fung et al. .................... 375/260
8,306,141 B2 * 11/2012 Castelain et al. ............. 375/267
(Continued)

FOREIGN PATENT DOCUMENTS

EP    1 959 603    8/2008
WO   2008 098670    8/2008

OTHER PUBLICATIONS
Ciochina et al., "A Novel Quasi-Orthogonal Space-Frequency Block Code for Single-Carrier FDMA", 2008 IEEE 67th Vehicular Technology Conference, May 14, 2008.*
Castelain et al., "Single-Carrier Space-Frequency Block Coding", 2007 66th Vehicular Technology Conference, published before Oct. 3, 2007.*

(Continued)

*Primary Examiner* — Khaled Kassim
*Assistant Examiner* — Zhaohui Yang
(74) *Attorney, Agent, or Firm* — Oblon, Spivak, McClelland, Maier & Neustadt, L.L.P.

(57) ABSTRACT

A method for determining a shifting parameter P to be used by a telecommunication device for mapping symbols on sub-carriers, the telecommunication device including at least two transmit antennas, the symbols being transferred through each antenna of the telecommunication device on at least an even number K, strictly greater than two, of sub-carriers allocated to the telecommunication device. The telecommunication device transfers on a first antenna on each sub-carrier 'k', a signal representing a symbol '$X_k$' in the frequency domain. The telecommunication device transfers on a second antenna on each sub-carrier 'k', a signal representing a symbol '$X'_k$' derived from the signal transferred on the first transmit antenna, for each frequency k, by the formula $X'^{secondAnt}_K = \epsilon(-1)^{k+1} X^*_{(p-1-k) \bmod K}$. Sub-carriers grouped in at least two clusters are allocated to the telecommunication device, and the shifting parameter p is even and determined according to clusters of sub-carriers allocated to the telecommunication device.

13 Claims, 7 Drawing Sheets

(56) References Cited

U.S. PATENT DOCUMENTS

| | | |
|---|---|---|
| 2006/0078066 A1 | 4/2006 | Yun et al. |
| 2009/0067534 A1* | 3/2009 | Kwak et al. .................. 375/267 |
| 2010/0014413 A1 | 1/2010 | Castelain et al. |
| 2010/0040164 A1 | 2/2010 | Castelain et al. |
| 2010/0150259 A1 | 6/2010 | Castelain et al. |
| 2011/0194524 A1* | 8/2011 | Hedlund et al. ............. 370/329 |

OTHER PUBLICATIONS

Ciochina, C., et al., "A Novel Space-Frequency Coding Scheme for Single Carrier Modulations," IEEE, The 18$^{th}$ Annual IEEE International Symposium on Personal, Indoor and Mobile Radio Communications (PIMRC'07), pp. 1-5, (2007) XP 031168487.

International Search Report issued Apr. 7, 2010 in PCT/EP10/053150 filed Mar. 12, 2010.

\* cited by examiner

Fig. 9

| | 920 | 921 | 922 | 923 |
|---|---|---|---|---|
| 900 | 0 | ▓ | $X_0$ | $-X_5^*$ |
| 901 | 1 | ▓ | $X_1$ | $X_4^*$ |
| 902 | 2 | | | |
| 903 | 3 | ▓ | $X_2$ | $-X_3^*$ |
| 904 | 4 | ▓ | $X_3$ | $X_2^*$ |
| 905 | 5 | ▓ | $X_4$ | $-X_1^*$ |
| 906 | 6 | ▓ | $X_5$ | $X_0^*$ |
| 907 | 7 | ▓ | $X_6$ | $-X_9^*$ |
| 908 | 8 | ▓ | $X_7$ | $X_8^*$ |
| 909 | 9 | | | |
| 910 | 10 | | | |
| 911 | 11 | | | |
| 912 | 12 | ▓ | $X_8$ | $-X_7^*$ |
| 913 | 13 | ▓ | $X_9$ | $X_6^*$ |
| 914 | 14 | | | |

Fig. 10

| | 1020 | 1021 | 1022 | 1023 |
|---|---|---|---|---|
| 1000 | 0 | ▓ | $X_0$ | $-X_5^*$ |
| 1001 | 1 | ▓ | $X_1$ | $X_4^*$ |
| 1002 | 2 | | $X_2$ | $-X_3^*$ |
| 1003 | 3 | | $X_3$ | $X_2^*$ |
| 1004 | 4 | | $X_4$ | $-X_1^*$ |
| 1005 | 5 | ▓ | $X_5$ | $X_0^*$ |
| 1006 | 6 | | | |
| 1007 | 7 | ▓ | $X_6$ | $-X_7^*$ |
| 1008 | 8 | ▓ | $X_7$ | $X_6^*$ |
| 1009 | 9 | | | |

Fig. 11

| $p$ | $J(p)$ | $D(p)$ |
|---|---|---|
| 0 | 4 | 13 |
| 2 | 4 | 10 |
| 4 | 8 | 8 |
| 6 | 8 | 6 |
| 8 | 4 | 8 |

Fig. 12

| | 1220 | 1221 | 1222 | 1223 |
|---|---|---|---|---|
| 1200 | 0 | ▓ | $X_0$ | $-X_7^*$ |
| 1201 | 1 | ▓ | $X_1$ | $X_6^*$ |
| 1202 | 2 | | | |
| 1203 | 3 | ▓ | $X_2$ | $-X_5^*$ |
| 1204 | 4 | ▓ | $X_3$ | $X_4^*$ |
| 1205 | 5 | ▓ | $X_4$ | $-X_3^*$ |
| 1206 | 6 | ▓ | $X_5$ | $X_2^*$ |
| 1207 | 7 | ▓ | $X_6$ | $-X_1^*$ |
| 1208 | 8 | ▓ | $X_7$ | $X_0^*$ |
| 1209 | 9 | | | |
| 1210 | 10 | | | |
| 1211 | 11 | | | |
| 1212 | 12 | ▓ | $X_8$ | $-X_9^*$ |
| 1213 | 13 | ▓ | $X_9$ | $X_8^*$ |
| 1214 | 14 | | | |

METHOD AND A DEVICE FOR DETERMINING A SHIFTING PARAMETER TO BE USED BY A TELECOMMUNICATION DEVICE FOR TRANSFERRING SYMBOLS

The present invention relates generally to a method and a device for determining a shifting parameter to be used by a telecommunication device for transferring symbols.

More precisely, the present invention is in the field of coding and decoding schemes used in the context of MIMO (Multiple Input Multiple Output) communications especially used in conjunction of OFDM or OFDMA-like transmission schemes.

Orthogonal Frequency-Division Multiplexing (OFDM) is based upon the principle of frequency-division multiplexing (FDM) and is implemented as a digital modulation scheme. The bit stream to be transmitted is split into several parallel bit streams, typically dozens to thousands. The available frequency spectrum is divided into several sub-channels, and each low-rate bit stream is transmitted over one sub-channel by modulating a sub-carrier using a standard modulation scheme, for example PSK, QAM, etc. The sub-carrier frequencies are chosen so that the modulated data streams are orthogonal to each other, meaning that cross talk between the sub-channels is eliminated.

The primary advantage of OFDM is its ability to cope with severe channel conditions, for example, multipath and narrowband interference, without complex equalization filters. Channel equalization is simplified by using many slowly modulated narrowband signals instead of one rapidly modulated wideband signal.

A variation called DFT spread OFDM or SC-FDMA (Single Carrier Frequency-Division Multiple Access) has been developed. In this system, each symbol to be transmitted is spread over a set of transmitted frequencies by a DFT (Discrete Fourier Transform), the resulting signal is sent over a conventional OFDMA transmission system.

Actual implementation of coding/decoding are made either in the frequency domain or in the time domain while the implementation in the frequency domain may be preferred.

It is known that the use of several antennas both at the emitter and the receiver, leading to MIMO systems allows the improvement of the robustness of the transmission. This improved robustness can be used to increase the range or the bandwidth by adjusting the classical range versus bandwidth tradeoff. Several types of diversity schemes could be used to take advantage of multiple antennas at the emitter.

Alamouti has developed an Orthogonal Space Time Block Code (OSTBC) wherein information to be transmitted are spread in space, by the different antennas, and in time, using different time slots. The reference paper regarding Alamouti codes is "A simple transmit diversity technique for wireless communications", *IEEE J. Select. Areas Commun.*, vol. 16, pp. 1451-1458, October 1998. In a first implementation of Alamouti code, two transmit antennas (FirstAnt and SecondAnt) are used for transferring two symbols a and b in two time slots (T1 and T2). At time T1 antenna FirstAnt transmits symbol a when antenna SecondAnt transmits symbol b. At time T2 antenna FirstAnt transmits symbol −b* when antenna SecondAnt transmits symbol a*, where "*" denotes the complex conjugate. This Alamouti code, let us call it classical Alamouti in time, has the advantage to offer simple coding and decoding, the increased diversity leading to better performance. It is to be noted that the throughput is not increased. The optimal MAP for Maximum A Posteriori decoding is very simple, it does not imply matrix inversion, log enumeration or sphere decoding as long as the channel does not vary between T1 and T2 and as long as the channel can be characterized by a simple multiplication. It is naturally well combined with OFDM or OFDM-like modulation schemes.

A second implementation of Alamouti code called OSFBC for Orthogonal Space Frequency Block Code is based on transmission of the data over two different frequencies (F1 and F2), and not over two different time slots. With two transmit antennas (FirstAnt and SecondAnt), two symbols a and b are respectively sent on two frequencies (F1 and F2) using an antenna FirstAnt which transmits symbol a when antenna SecondAnt transmits symbol b. Through the antenna FirstAnt, the symbol −b* is sent on the frequency F1 and the symbol a* is sent on the frequency F2 through the antenna SecondAnt.

The two frequencies are adjacent, to limit the variations of the channel.

By definition, this scheme is applied to OFDMA or OFDMA-like modulation schemes. By OFDMA-like modulations, we denote for example some frequency-domain implementation of a single carrier scheme, in which preferably, but not strictly necessarily, a cyclic prefix has been added, like for example the described DFT-spread OFDM. Compared to OSTBC, the advantage is the use of only one modulation slot, which can be advantageous from the multiplexing point of view, and may lead to better performance in case of very fast variations of the channel like high Doppler. Alamouti codes, due to their simple implementation and good performance are very attractive schemes to be used in MIMO transmission. When applied to SC-FDMA like modulation schemes, these codes do not have the valuable feature to produce signals with the low variation envelope property for each antenna, the envelope being the modulus of the complex envelope.

In the published patent invention WO 2008/098672, it has been proposed a method of radio data emission, by an emitter comprising at least two transmit antennas. The signal transmitted on a first antenna being considered in the frequency domain as resulting from a DFT of size K leading to the emission of a symbol on each of the K sub-carriers allocated to the emitter on the first antenna. A SC(p) relation is defined by $X_k^{SecondAnt} = \epsilon(-1)^{k+1} X^*_{(p-1-k) \mod K}$ for k=0 to K−1 giving the signal to be emitted on a second antenna SecondAnt from the signal to be emitted on the first antenna FirstAnt, where p is an even shifting parameter between 0 and K−1, K is even and k is the index of each used sub-carrier in the frequency domain.

The use of above mentioned technique is not adapted into systems wherein the sub-carriers allocated to the telecommunication device are not consecutive.

The present invention aims at providing a telecommunication system in which it is possible to use above mentioned technique in a system wherein the sub-carriers allocated to the telecommunication device are not consecutive.

To that end, the present invention concerns a method for determining a shifting parameter p to be used by a telecommunication device for mapping symbols on sub-carriers, the telecommunication device comprising at least two transmit antennas, the symbols being transferred through each antenna of the telecommunication device on at least an even number K, strictly greater than two, of sub-carriers allocated to the telecommunication device, the telecommunication device transferring on a first antenna of the telecommunication device during a time slot on each allocated sub-carrier 'k', with k=0 to K−1, a signal representing a symbol '$X_k$' in the frequency domain, the telecommunication device transferring on a second antenna of the telecommunication device during the time slot, on allocated sub-carrier 'k', with k=0 to K−1, a signal representing a symbol '$X'_k$' derived from the signal transferred on the first transmit antenna, by the formula $X'^{secondAnt}_k = \epsilon(-1)^{k+1} X^*_{(p-1-k) \bmod K}$, where $\epsilon$ is 1 or −1, X* means the complex conjugate of X, p-1-k is taken modulo K with K even, and p even, characterized in that the method comprises the steps of:

allocating sub-carriers to the telecommunication device, the sub-carriers are grouped in at least two clusters, each cluster being separated from another cluster by at least one sub-carrier not allocated to the telecommunication device, determining the shifting parameter p, the shifting parameter p being even and determined according to clusters of sub-carriers allocated to the telecommunication device.

The present invention concerns also a device for determining a shifting parameter p to be used by a telecommunication device for mapping symbols on sub-carriers, the telecommunication device comprising at least two transmit antennas, the symbols being transferred through each antenna of the telecommunication device on at least an even number K, strictly greater than two, of sub-carriers allocated to the telecommunication device, the telecommunication device transferring on a first antenna of the telecommunication device during a time slot on each allocated sub-carrier 'k', with k=0 to K−1, a signal representing a symbol '$X_k$' in the frequency domain, the telecommunication device transferring on a second antenna of the telecommunication device during the time slot, on each allocated sub-carrier 'k', with k=0 to K−1, a signal representing a symbol '$X'_k$' derived from the signal transferred on the first transmit antenna, by the formula $X'^{secondAnt}_k = \epsilon(-1)^{k+1} X^*_{(p-1-k) \bmod K}$, where $\epsilon$ is 1 or −1, X* means the complex conjugate of X, p-1-k is taken modulo K with K even, and p even, characterized in that the device for determining a shifting parameter comprises:

means for allocating sub-carriers to the telecommunication device, the sub-carriers are grouped in at least two clusters, each cluster being separated from another cluster by at least one sub-carrier not allocated to the telecommunication device, means for determining the shifting parameter p, the shifting parameter p being even and determined according to clusters of sub-carriers allocated to the telecommunication device.

Thus, the sub-carrier resource allocation is more flexible and can be adapted to cases wherein the communication conditions are good in discontinuous frequency bands.

Furthermore, the present invention ensures that the signal transferred on one transmit antenna has the same PAPR as the one transmitted on the other transmit antenna.

Finally, the performances of the system are kept at a good level.

According to a particular feature, the k-th allocated sub-carrier on which symbols $X_k$ and $X'_k = (-1)^k X^*_{(p-1-k) \bmod K}$ are mapped on first and respectively second transmit antennas, and the (p-1-k)mod K-th allocated sub-carrier on which symbols $X_{(p-1-k) \bmod K}$ and $(-1)^{(p-1-k) \bmod K} X^*_k$ are mapped on first and respectively second transmit antennas, are paired and the shifting parameter p is determined so as to minimize the number of sub-carriers comprised between the most distanced paired sub-carriers.

Thus, performance loss due to coding on distanced sub-carriers is minimized.

According to a particular feature, the subcarrier equally distanced from the extreme sub-carriers allocated to the telecommunication device is determined and the shifting parameter p is determined according to the fact that the mean is or not a sub-carrier allocated to the telecommunication device.

According to a particular feature, the k-th allocated sub-carrier on which symbols $X_k$ and $X'_k = (-1)^k X^*_{(p-1-k) \bmod K}$ are mapped on first and respectively second transmit antennas, and the (p-1-k)mod K-th allocated sub-carrier on which symbols $X_{(p-1-k) \bmod K}$ and $(-1)^{(p-1-k) \bmod K} X^*_k$ are mapped on first and respectively second transmit antennas, are paired and parameter p is determined as following: if the mean is a sub-carrier allocated to the telecommunication device, the shifting parameter p is equal to the number of sub-carriers allocated to the telecommunication device and comprised in the first cluster or is equal to the sum of the number of sub-carriers allocated to the telecommunication device and comprised in at least two clusters.

Thus, signalling may be reduced.

According to a particular feature, the k-th allocated sub-carrier on which symbols $X_k$ and $X'_k = (-1)^k X^*_{(p-1-k) \bmod K}$ are mapped on first and respectively second transmit antennas, and the (p-1-k)mod K-th allocated sub-carrier on which symbols $X_{(p-1-k) \bmod K}$ and $(-1)^{(p-1-k) \bmod K} X^*_k$ are mapped on first and respectively second transmit antennas, are paired and the shifting parameter p is determined so as to minimize the number of sub-carriers paired with sub-carriers mapped in different clusters.

Thus, the number of paired symbols suffering uncorrelated channel realizations is reduced and performance loss is minimized.

According to a particular feature, a cost function J(p) which is equal to the number of sub-carriers allocated to the mobile station which are paired to a sub-carrier of another cluster is computed for each possible value of the shifting parameter and the shifting parameter value p is determined as the value of p which corresponds to the minimum value of J(p).

According to a particular feature, the maximum distance between two paired sub-carriers is determined for each possible value of the shifting parameter and the value of the shifting parameter p among the values of p which minimize J(p) is the one which corresponds to the lowest maximum distance between two paired sub-carriers.

According to a particular feature, the determination of the shifting parameter is executed by a base station of a wireless cellular telecommunication network and the telecommunication device is a mobile station handled by the base station.

According to a particular feature, information representative of the sub-carriers allocated to the mobile station are transferred to the mobile station.

Thus, the mobile station is able to determine itself the shifting parameter p. The signalling between the base station and the mobile station is reduced.

According to a particular feature, information representative of the determined shifting parameter, are transferred to the mobile station.

Thus, the mobile station is less complex.

According to a particular feature, the base station de maps symbols on sub-carriers allocated to the mobile station using the shifting parameter determined for the mobile station.

According to a particular feature, the determination of the a shifting parameter p is executed by a mobile station of a wireless cellular telecommunication network.

Thus, the signalling is reduced.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer program are the same as those set out above related to the method and apparatus according to the invention, they will not be repeated here.

The characteristics of the invention will emerge more clearly from a reading of the following description of an example embodiment, the said description being produced with reference to the accompanying drawings, among which:

Figure 6:
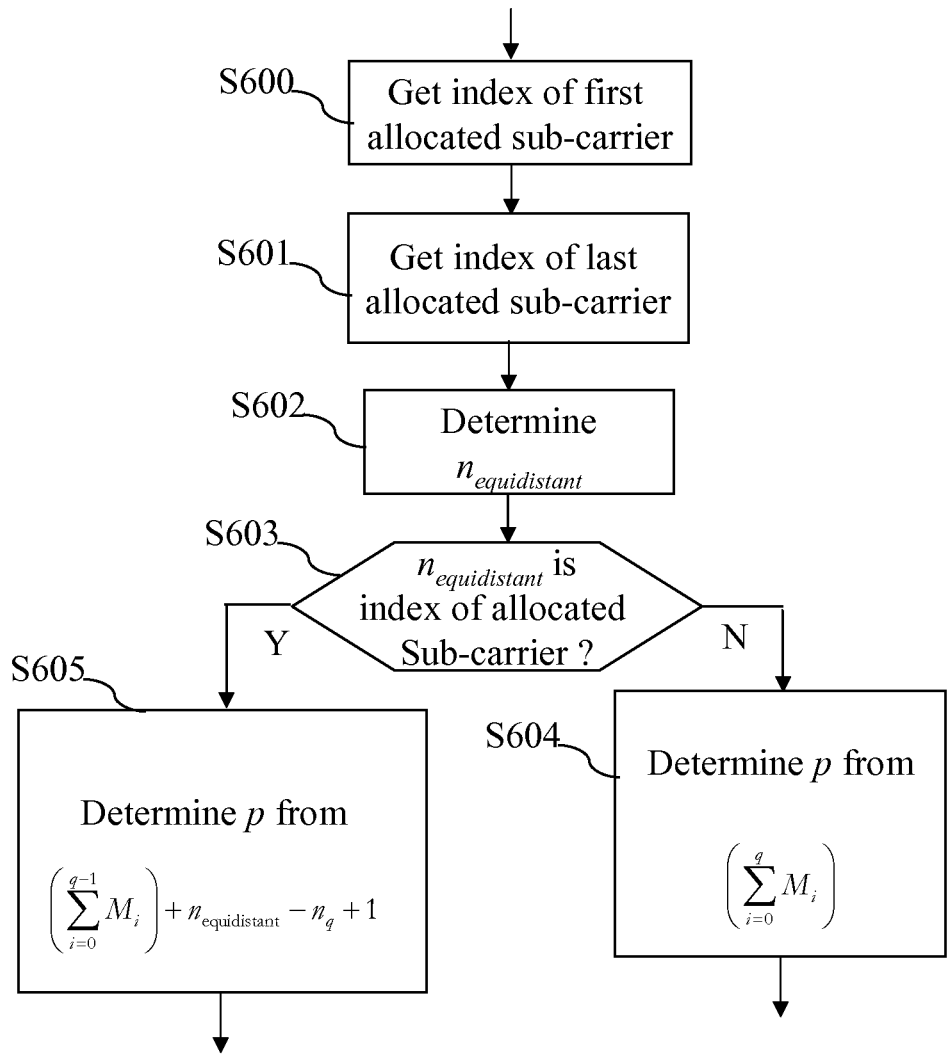
Figure 7:
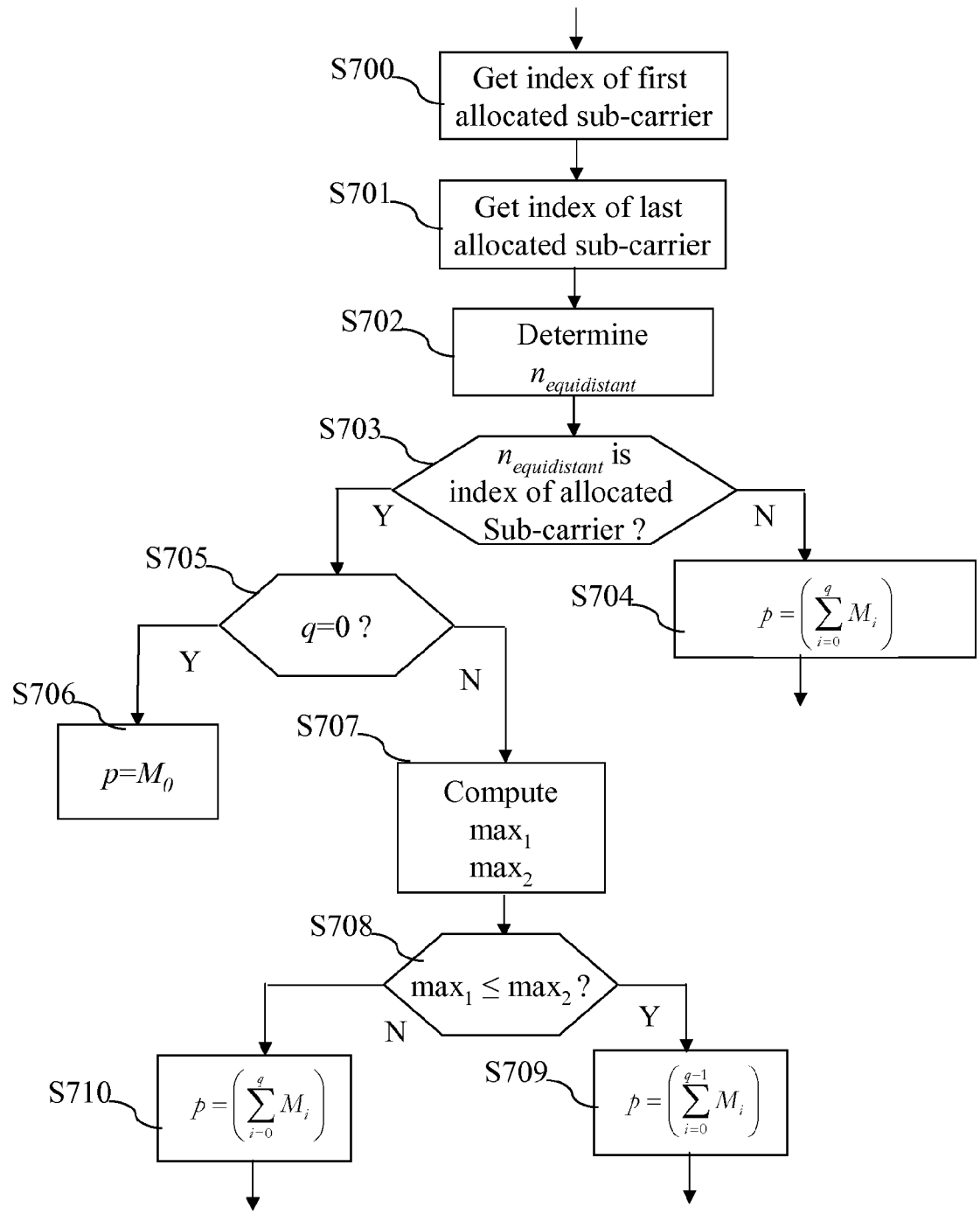
Figure 8:
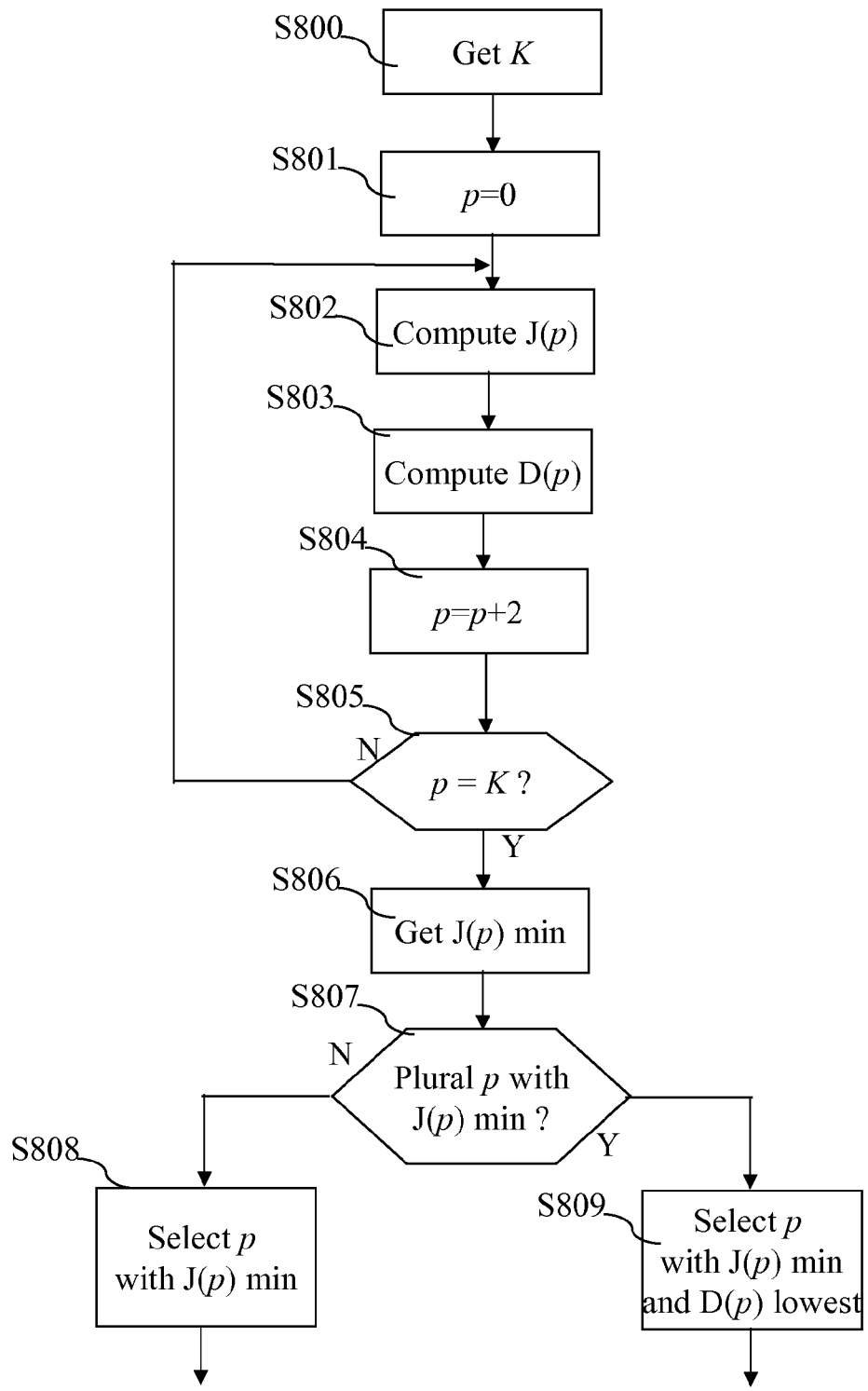
Figure 13:
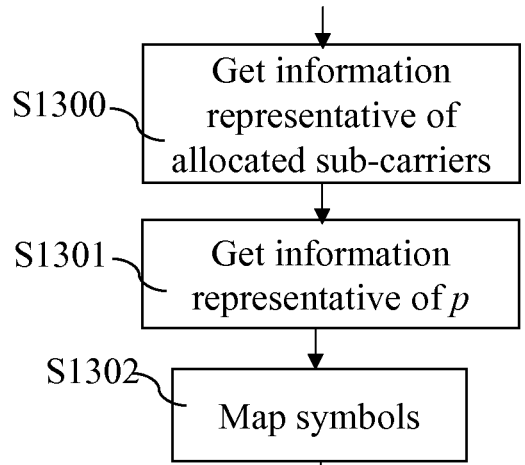
Figure 14:
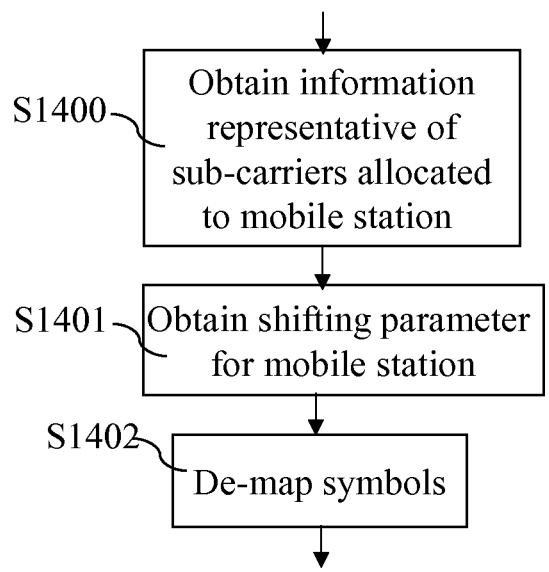

FIG. 6 discloses an example of an algorithm executed by a base station according to a first mode of realisation of the present invention;

FIG. 7 discloses an example of an algorithm executed by a base station according to a second mode of realisation of the present invention when each cluster comprises an even number of sub-carriers;

FIG. 8 discloses an example of an algorithm executed by a base station according to a third mode of realisation of the present invention;

FIG. 9 represents an example of mapping of symbols on sub-carriers according to the first mode of realisation of the present invention;

FIG. 10 represents an example of mapping of symbols on sub-carriers according to the second mode of realisation of the present invention;

FIG. 11 represents a table of cost function values and maximum distance values between sub-carriers which are associated;

FIG. 12 represents an example of mapping of symbols on sub-carriers according to the third mode of realisation of the present invention;

FIG. 13 discloses an example of an algorithm for mapping symbols using the shifting parameter determined according to the present invention;

FIG. 14 discloses an example of an algorithm for de-mapping symbols using the shifting parameter determined according to the present invention.

Figure 1:
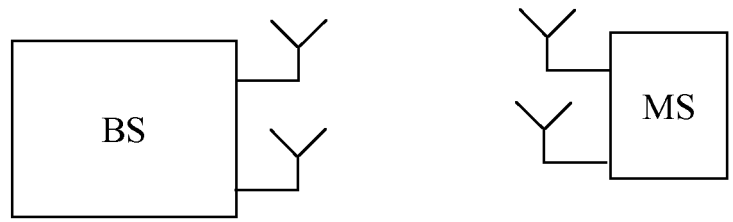
FIG. 1 represents a wireless cellular telecommunication network in which the present invention is implemented.

FIG. 1 represents a wireless cellular telecommunication network in which the present invention is implemented.

The present invention will be described in an example wherein the telecommunication system is a wireless cellular telecommunication system.

The present invention is also applicable to wireless or wired telecommunication systems like Local Area Networks.

In that case, the base station and mobile station are emitters and/or receivers.

In FIG. 1, one base station BS of a wireless cellular telecommunication network and a mobile station MS are shown.

The present invention is described when the shifting parameter p is determined by a base station.

In a variant, the shifting parameter is determined by the mobile station from clusters of sub-carriers which are allocated to it by the base station.

The base station BS is a base station of a wireless cellular telecommunication network comprising plural base stations.

Only one mobile station MS is shown for the sake of clarity but the wireless cellular telecommunication network may have a more important number of mobile stations MS to communicate with the base station BS.

The base station BS may be named a node or an access point.

The mobile station MS may be a personal computer, a peripheral device like a set top box, or a phone.

According to the invention, a shifting parameter p to be used by a telecommunication device for mapping symbols on sub-carriers is determined. The telecommunication device comprises at least two transmit antennas, the symbols being transferred through each antenna of the telecommunication device on at least an even number K, strictly greater than two, of sub-carriers allocated to the telecommunication device. The telecommunication device transfers on a first antenna of the telecommunication device during a time slot on each allocated sub-carrier 'k', with k=0 to K−1, a signal representing a symbol '$X_k$' in the frequency domain. The telecommunication device transfers on a second antenna of the telecommunication device during the time slot, on each allocated sub-carrier 'k', with k=0 to K−1, a signal representing a symbol '$X'_k$' derived from the signal transferred on the first transmit antenna, by the formula $X'^{secondAnt}_k = \epsilon(-1)^{k+1} X^*_{(p-1-k) \bmod K}$, where $\epsilon$ is 1 or −1, $X^*$ means the complex conjugate of X, p-1-k is taken modulo K, K and p even.

Sub-carriers allocated to the telecommunication device are grouped in at least two clusters, each cluster being separated from another cluster by at least one sub-carrier not allocated to the telecommunication device.

The shifting parameter p is determined as being even and according to clusters of sub-carriers allocated to the telecommunication device.

Figure 2:
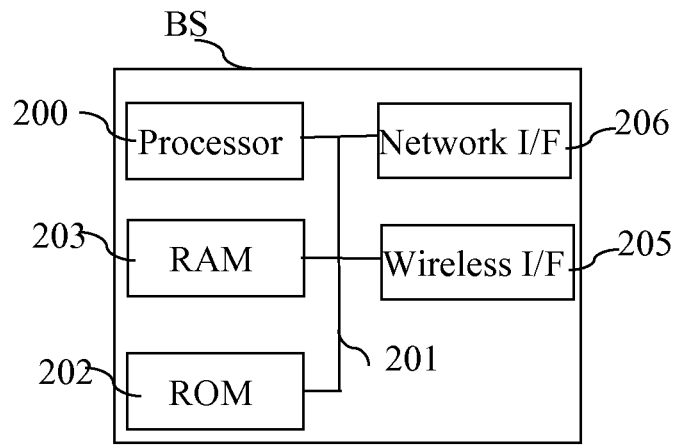
FIG. 2 is a diagram representing the architecture of a base station in which the present invention is implemented.

FIG. 2 is a diagram representing the architecture of a base station in which the present invention is implemented.

The base station BS has, for example, an architecture based on components connected together by a bus 201 and a processor 200 controlled by the program as disclosed in FIGS. 6, 7 or 8, 13 and/or 14.

It has to be noted here that the base station BS may have an architecture based on dedicated integrated circuits.

The bus 201 links the processor 200 to a read only memory ROM 202, a random access memory RAM 203, a wireless interface 205 and a network interface 206.

The memory 203 contains registers intended to receive variables and the instructions of the program related to the algorithm as disclosed in FIGS. 6, 7 or 8, 13 and/or 14.

The processor 200 controls the operation of the network interface 206 and of the wireless interface 205.

The read only memory 202 contains instructions of the program related to the algorithm as disclosed in FIGS. 6, 7 or 8, 13 and/or 14, which are transferred, when the base station BS is powered on, to the random access memory 203.

The base station BS may be connected to a telecommunication network through the network interface 206. For example, the network interface 206 is a DSL (Digital Subscriber Line) modem, or an ISDN (Integrated Services Digital Network) interface, etc.

The wireless interface 205 comprises means for transferring information representative of the sub-carriers allocated to the mobile station MS.

When the shifting parameter p is determined by the base station, the wireless interface 205 comprises means for transferring information representative of the shifting parameter determined for the mobile station MS and to be used by the mobile station MS for mapping and/or de-mapping symbols on allocated sub-carriers. The wireless interface 205 comprises an encoder as disclosed in FIG. 4 and/or a decoder as disclosed in FIG. 5.

Figure 3:
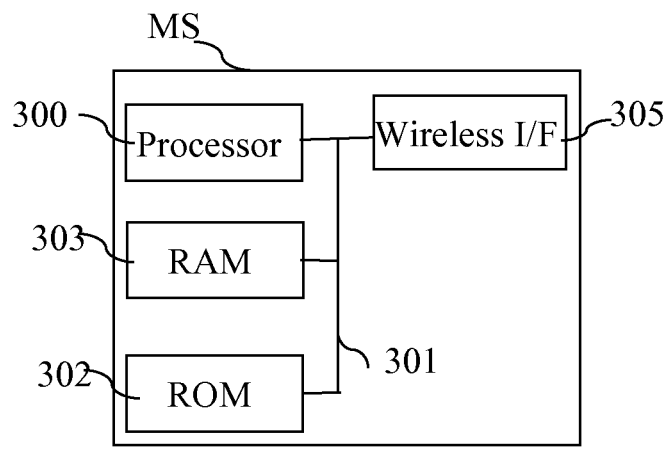
FIG. 3 is a diagram representing the architecture of a mobile station in which the present invention is implemented.

FIG. 3 is a diagram representing the architecture of a mobile station in which the present invention is implemented.

The mobile station MS has, for example, an architecture based on components connected together by a bus 301 and a processor 300 controlled by the program as disclosed in FIGS. 6, 7 or 8, 13 and/or 14.

It has to be noted here that the mobile station MS may have an architecture based on dedicated integrated circuits.

The bus 301 links the processor 300 to a read only memory ROM 302, a random access memory RAM 303 and a wireless interface 305.

The memory 303 contains registers intended to receive variables and the instructions of the program related to the algorithm as disclosed in FIGS. 6, 7 or 8, 13 and/or 14.

The processor 300 controls the operation of the wireless interface 305.

The read only memory 302 contains instructions of the program related to the algorithm as disclosed in FIGS. 13 and/or 14, which are transferred, when the mobile station MS is powered on, to the random access memory 303.

The wireless interface 305 comprises means for mapping data on sub-carriers comprised in the clusters of sub-carriers allocated to the mobile station MS according to the shifting parameter determined for the mobile station MS by the base station BS or by the mobile station MS from clusters of sub-carriers allocated to the mobile station MS and means for de-mapping symbols. The wireless interface 305 comprises an encoder as disclosed in FIG. 4 and/or a decoder as disclosed in FIG. 5.

Figure 4:
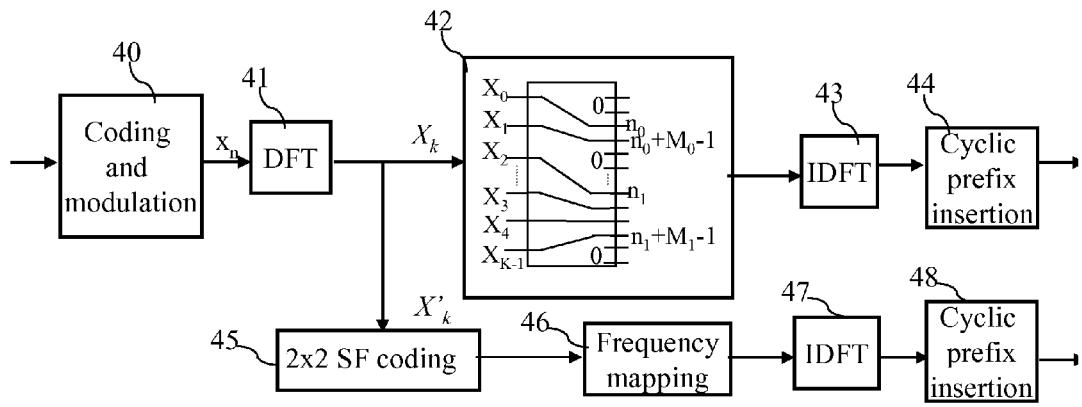
FIG. 4 illustrates the architecture of the encoder comprised in a mobile station according to a particular embodiment of the invention in frequency domain.

FIG. 4 illustrates the architecture of the encoder according to a particular embodiment of the invention in frequency domain.

Data to be transmitted are coded and organized as symbols by the coding and modulation module 40 giving a set of symbols $x_n$. Then the signal is spread in the frequency domain by the DFT (Discrete Fourier Transform) module 41. In a variant, the DFT module is replaced by a Fast Fourier Transform module or any other processing module.

In case of OFDMA, DFT module may not be needed.

The symbols spread in the frequency domain are mapped on sub-carriers comprised in the allocated frequency band by a frequency mapping module 42 which maps data to be transferred on sub-carriers. The frequency mapping module 42 comprises zero insertion and/or frequency shaping capabilities.

The frequency mapping module 42 maps symbols on the frequency band allocated to the mobile station MS. As the sub-carriers are not allocated in a contiguous sub-band, the frequency band is separated into several clusters. The frequency mapping module 42 maps symbols on the different clusters of the frequency band allocated to the mobile station MS.

In FIG. 4, the frequency mapping module 42 shows an example wherein $K=M_0+M_1$ symbols are mapped on K sub-carriers of two clusters. A first cluster comprises the sub-carriers noted $n_0$ to $M_0-1$ and a second cluster comprises the sub-carriers noted $n_1$ to $M_1-1$. $M_i$ are generally even.

The symbols outputted by the frequency mapping module 42 are transformed back in the time domain by the IDFT (Inverse Discrete Fourier Transform) module 43.

An optional cyclic prefix insertion module 44 can be applied before transmission through a first antenna of the mobile station MS.

A second antenna of the mobile station MS is fed by data computed by the space frequency block code computation module 45 according to the shifting parameter p determined for the mobile station MS, leading to a new branch having a frequency mapping module 46 identical to the frequency mapping module 42, an IDFT module 47 and an optional cyclic prefix insertion module 48 as the IDFT module 43 and cyclic prefix insertion module 44 respectively.

The space frequency block code computation module 45 is connected to the output of the DFT module 41.

Figure 5:
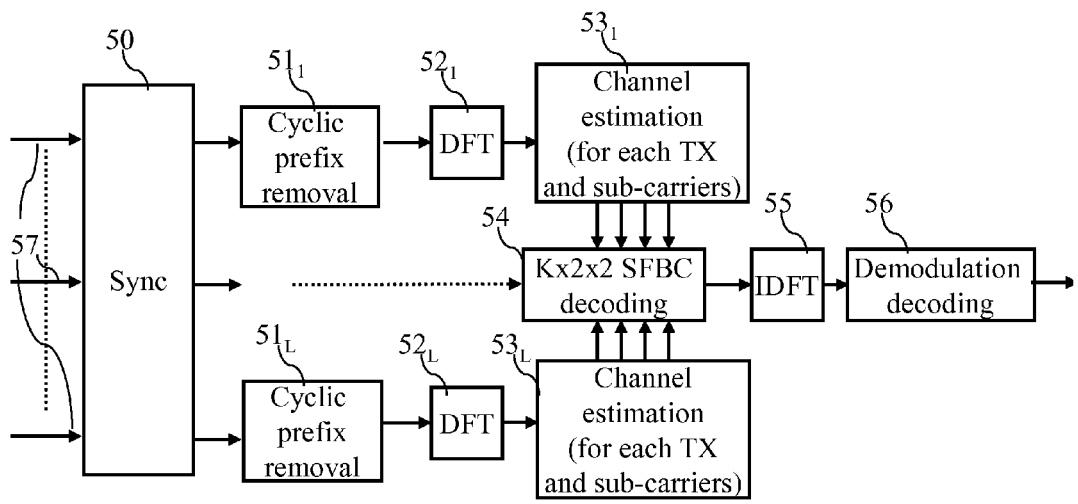
FIG. 5 illustrates the architecture of the decoder of a base station having several receive antennas according to a particular embodiment of the invention.

FIG. 5 illustrates the architecture of the decoder of a device having several receive antennas according to a particular embodiment of the invention.

Several signals 57 are received from the receive antennas. The synchronization module 50 synchronizes all these received signals 57.

The optional cyclic prefix removal modules $51_1$ to $51_L$ remove the cyclic prefix if used, in parallel to all the synchronized signals.

The DFT modules $52_1$ to $52_L$ execute a DFT on the synchronized signals on which the cyclic prefix has been removed or not. In a variant, the DFT module is replaced by a Fast Fourier Transform module or any other processing module.

L modules, possibly one complex module, of channel estimation $53_1$ to $53_L$ will work on the L signals and feeding one decoder module 54 comprising K two by two elementary space frequency block decoders serially processing the pairs of sub-carriers. An inverse DFT module 55 before a classical channel decoding module 56 treats the resulting signal.

In case of OFDMA, IDFT module 55 may not be needed. In other variants, it may be replaced with other processing modules.

FIG. 6 discloses an example of an algorithm for determining the shifting parameter for a mobile station according to a first mode of realisation of the present invention.

For example, the present algorithm will be described when it is executed by the processor 200 of the base station BS.

The same algorithm may also be executed by the processor 300 of the mobile station MS when information indicating the clusters of sub-carriers are received from the base station BS by the mobile station MS.

The present algorithm is executed each time clusters of sub-carriers are allocated to a mobile station MS handled by the base station BS.

At step S600, the processor 200 gets the index $n_0$ of the first sub-carrier allocated to the mobile station MS. The first sub-carrier allocated to the mobile station MS is the first sub-carrier of the first cluster $CL_0$ allocated to the mobile station MS and comprising $M_0$ sub-carriers.

At next step S601, the processor 200 gets the index of the last sub-carrier allocated to the mobile station MS. The index of the last sub-carrier allocated to the mobile station MS is equal to $n_{Nc-1}$ plus $M_{Nc-1}$ minus one, where Nc is the number of clusters allocated to the mobile station MS, $n_{Nc-1}$ is the index of the first sub-carrier of the last cluster $CL_{Nc-1}$ comprising $M_{Nc-1}$ sub-carriers At next step S602, the processor 200 determines the index noted $n_{equidistant}$ of the sub-carrier which is sensibly equidistant from the first and last sub-carrier allocated to the mobile station MS according to the following formula:

$n_{equidistant} = \text{ceil}((n_{Nc-1} + M_{Nc-1} - 1 + n_0)/2)$ where "ceil(x)" denotes the closest integer superior or equal to x.

At next step S603, the processor 200 checks if $n_{equidistant}$ is the index of a sub-carrier allocated to the mobile station MS.

If $n_{equidistant}$ is the index of a sub-carrier allocated to the mobile station MS, the processor 200 moves to step S605. Otherwise, the processor 200 moves to step S604.

At step S604, the processor 200 determines the shifting parameter p to be used for the mobile station MS using the following formula:

$$\left(\sum_{i=0}^{q} M_i\right),$$

where q is the index of the cluster $CL_q$ which is the closest from $n_{equidistant}$ and which comprises sub-carriers which have an index lower than $n_{equidistant}$. $M_i$ are generally even. p is selected as the closest even integer inferior or equal to $$\left(\sum_{i=0}^{q} M_i\right).$$

After that, the processor 200 interrupts the present algorithm.

At step S605, the processor 200 determines the shifting parameter p to be used for the mobile station using the following formula:

$$\left(\sum_{i=0}^{q-1} M_i\right) + n_{equidistant} - n_q + 1,$$

where q is the index of the cluster $CL_q$ which comprises the sub-carrier of index $n_{equidistant}$ and where $n_q$ is the index of the first sub-carrier of the cluster $CL_q$.

p is selected as the closest even integer inferior or equal to $$\left(\sum_{i=0}^{q-1} M_i\right) + n_{equidistant} - n_q + 1.$$

After that, the processor 200 interrupts the present algorithm.

According to the first mode of realisation of the invention, the maximum distance between paired sub-carriers is minimized.

FIG. 9 represents an example of mapping of symbols on sub-carriers according to the first mode of realisation of the present invention.

In the example of the FIG. 9, the frequency band comprises fifteen sub-carriers noted 0 to 14 in the column 920. Ten of the sub-carriers are allocated to the mobile station MS. The sub-carriers allocated to the mobile station MS are indicated by grey rectangles in the column 921. The allocated sub-carriers belong to three clusters. The sub-carriers 0 and 1 belong to the cluster $CL_0$, the sub-carriers 3 to 8 belong to the cluster $CL_1$ and the sub-carriers 12 and 13 belong to the cluster $CL_2$.

According to the example of the FIG. 9, the processor 200 determines that the index noted $n_{equidistant}$ is 1 equal to 7.

As the sub-carrier with index 7 is comprised in the cluster $CL_1$, the processor 200 determines at step S605 the shifting parameter p as equal to 6.

The emitter comprises two transmit antennas which transfer K equals ten symbols on sub-carriers of the frequency band allocated to the mobile station MS. The symbols $X_0$ to $X_9$ shown in the column 922 are transferred through a first antenna. The symbols $X_0$ to $X_9$ are modified according to the following formula by $X'^{secondAnt}_k = (-1)^{k+1} X^*_{(p-1-k) \bmod K}$ for k=0 to K−1 and p=6 giving the signal to be emitted on the second antenna from the signal X to be emitted on the first antenna.

The line 900 comprises the sub-carrier 0 on which the couple of symbols ($X_0$, $-X_5^*$) is mapped. The line 906 comprises the sub-carrier 5 on which the couple of symbols ($X_5$, $X_0^*$) is mapped. Same symbols $X_0$ and $X_5$ are mapped on the sub-carriers 0 and 6, the sub-carriers 0 and 6 are paired.

The line 901 comprises the sub-carrier 1 on which the couple of symbols ($X_1$, $X_4^*$) is mapped. The line 905 comprises the sub-carrier 5 on which the couple of symbols ($X_4$, $-X_1^*$) is mapped. Same symbols $X_1$ and $X_4$ are mapped on the sub-carriers 1 and 5.

The line 903 comprises the sub-carrier 3 on which the couple of symbols ($X_2$, $-X_3^*$) is mapped. The line 904 comprises the sub-carrier 4 on which the couple of symbols ($X_3$, $X_2^*$) is mapped. Same symbols $X_2$ and $X_3$ are mapped on the sub-carriers 903 and 904.

The line 907 comprises the sub-carrier 7 on which the couple of symbols ($X_6$, $-X_0^*$) is mapped. The line 913 comprises the sub-carrier 13 on which the couple of symbols ($X_9$, $X_6^*$) is mapped. Same symbols $X_6$ and $X_9$ are mapped on the sub-carriers 7 and 13.

The line 908 comprises the sub-carrier 8 on which the couple of symbols ($X_7$, $X_8^*$) is mapped. The line 912 comprises the sub-carrier 12 on which the couple of symbols ($X_8$, $-X_7^*$) is mapped. Same symbols $X_6$ and $X_9$ are mapped on the sub-carriers 8 and 12.

FIG. 7 discloses an example of an algorithm for determining the shifting parameter for a mobile station according to a second mode of realisation of the present invention when each cluster comprises an even number of sub-carrier.

For example, the present algorithm will be described when it is executed by the processor 200 of the base station BS.

The same algorithm may also be executed by the processor 300 of the mobile station MS when information indicating the clusters of sub-carriers are received for the base station BS by the mobile station MS.

The present algorithm is executed each time clusters of sub-carriers are allocated to a mobile station MS handled by the base station BS.

At step S700, the processor 200 gets the index $n_0$ of the first sub-carrier allocated to the mobile station MS. The first sub-carrier allocated to the mobile station MS is the first sub-carrier of the first cluster $CL_0$ allocated to the mobile station MS and comprising $M_0$ sub-carriers.

At next step S701, the processor 200 gets the index of the last sub-carrier allocated to the mobile station MS. The index of the last sub-carrier allocated to the mobile station MS is equal to $n_{Nc-1}$ plus $M_{Nc-1}$ minus 1, where Nc is the number of clusters allocated to the mobile station MS, $n_{Nc-1}$ is the index of the first sub-carrier of the last cluster $CL_{Nc-1}$ comprising $M_{Nc-1}$ sub-carriers At next step S702, the processor 200 determines the index noted $n_{equidistant}$ of the sub-carrier which is sensibly equidistant from the first and last sub-carrier allocated to the mobile station MS according to the following formula:

$n_{equidistant} = \text{ceil}((n_{Nc-1}+M_{Nc-1}-1+n_0)/2)$ where "ceil(x)" denotes the closest integer superior or equal to x.

At next step S703, the processor 200 checks if $n_{equidistant}$ is the index of a sub-carrier allocated to the mobile station MS.

If $n_{equidistant}$ is the index of a sub-carrier allocated to the mobile station MS, the processor 200 moves to step S705. Otherwise, the processor 200 moves to step S704.

At step S704, the processor 200 determines the shifting parameter p to be used for the mobile station using the following formula:

Compute $$\left(\sum_{i=0}^{q} M_i\right),$$

where q is the index of the cluster $CL_q$ which is the closest from $n_{equidistant}$ and which comprises sub-carriers which have an index lower than $n_{equidistant}$.

p is selected as the closest even integer inferior or equal to $$\left(\sum_{i=0}^{q} M_i\right).$$

$M_i$ are generally even and equality stands.

After that, the processor 200 interrupts the present algorithm.

At step S705, the processor 200 checks if $n_{equidistant}$ is the index of a sub-carrier comprised in the cluster $CL_0$.

If $n_{equidistant}$ is the index of a sub-carrier comprised in the cluster $CL_0$, the processor 200 moves to step S706. Otherwise, the processor 200 moves to step S707.

At step S706 the processor 200 sets the value of the shifting parameter p to be used for the mobile station MS as equal to $M_0$, which must be even. Otherwise, p is set to the greatest even integer inferior to this value.

After that, the processor 200 interrupts the present algorithm.

At step S707, the processor computes to values noted $max_1$ and $max_2$ using the following formulas:

$max_1 = max(n_{q-1}+M_{q-1}n_0, n_{Nc-1}+M_{Nc-1}-n_q)$ $max_2 = max(n_q+M_q-n_0, n_{Nc-1}+M_{Nc-1}n_{q+1})$ where q is the index of the cluster $CL_q$ which comprises the sub-carrier of index $n_{equidistant}$.

At next step S708, the processor 200 checks if $max_1$ is lower or equal to $max_2$.

If $max_1$ is lower or equal to $max_2$, the processor 200 moves to step S709. Otherwise, the processor 200 moves to step S710.

At step S709, the processor 200 computes the shifting parameter p to be used for the mobile station MS using the following formula:

$$\sum_{i=0}^{q-1} M_i$$

where q is the index of the cluster $CL_q$ which comprises the sub-carrier of index $n_{equidistant}$. Mi are generally even and $$p = \sum_{i=0}^{q-1} M_i.$$

Otherwise, p is selected as the closest even integer inferior or equal to $$\left(\sum_{i=0}^{q} M_i\right).$$

After that, the processor 200 interrupts the present algorithm.

At step S710, the processor 200 computes the shifting parameter p to be used for the mobile station MS using the following formula:

$$p = \sum_{i=0}^{q} M_i$$

where q is the index of the cluster $CL_q$ which comprises the sub-carrier of index $n_{equidistant}$ and Mi are even. Otherwise, p is selected as the closest even integer inferior or equal to $$\left(\sum_{i=0}^{q} M_i\right).$$

After that, the processor 200 interrupts the present algorithm.

According to the second mode of realisation of the invention, the maximum distance between paired sub-carriers is minimized and the shifting parameter p is chosen as to be equal to a sum of the number of sub-carriers comprised in at least one cluster.

FIG. 10 represents an example of mapping of symbols on sub-carriers according to the second mode of realisation of the present invention.

In the example of the FIG. 10, the frequency band comprises ten sub-carriers noted 0 to 9 in the column 1020. Eight of the sub-carriers are allocated to the mobile station MS. The sub-carriers allocated to the mobile station MS are indicated by grey rectangles in the column 1021. The allocated sub-carriers belong to two clusters. The sub-carriers 0 to 5 belong to the cluster $CL_0$, the sub-carriers 7 and 8 belong to the cluster $CL_1$.

According to the example of the FIG. 10, the processor 200 determines that the index noted $n_{equidistant}$ is equal to 4.

As the sub-carrier with index 4 is comprised in the cluster $CL_0$, the processor 200 moves from step S703 to step S705 and determines at step S706 the shifting parameter p as equal to 6.

The emitter comprises two transmit antennas which transfer K equals eight symbols on sub-carriers of the frequency band allocated to the mobile station MS. The symbols $X_0$ to $X_7$ shown in the column 1022 are transferred through a first antenna. The symbols $X_0$ to $X_9$ are modified according to the following formula by $X'^{secondAnt}_k = (-1)^{k+1} X^*_{(p-1-k) \mod K}$ for k=0 to K−1 and p=6 giving the signal to be emitted on the second antenna from the signal X to be emitted on the first antenna.

The line 1000 comprises the sub-carrier 0 on which the couple of symbols ($X_0$, $-X_5^*$) is mapped. The line 1005 comprises the sub-carrier 5 on which the couple of symbols ($X_5$, $X_0^*$) is mapped. Same symbols $X_0$ and $X_5$ are mapped on the sub-carriers 0 and 5. No impairment exists for the sub-carriers 0 and 5. As no impairment occurs, the decoding of the received symbols $X_0$ and $X_5$ at the receiver side is possible.

The line 1001 comprises the sub-carrier 1 on which the couple of symbols ($X_1$, $X_4^*$) is mapped. The line 1004 comprises the sub-carrier 4 on which the couple of symbols ($X_4$, $-X_1^*$) is mapped. Same symbols $X_1$ and $X_4$ are mapped on the sub-carriers 1 and 4.

The line 1002 comprises the sub-carrier 2 on which the couple of symbols ($X_2$, $-X_3^*$) is mapped. The line 1003 comprises the sub-carrier 3 on which the couple of symbols ($X_3$, $X_2^*$) is mapped. Same symbols $X_2$ and $X_3$ are mapped on the sub-carriers 2 and 3 No impairment exists for the sub-carriers 2 and 3.

The line 1007 comprises the sub-carrier 7 on which the couple of symbols ($X_6$, $-X_7^*$) is mapped. The line 1008 comprises the sub-carrier 8 on which the couple of symbols ($X_7$, $X_6^*$) is mapped. Same symbols $X_6$ and $X_7$ are mapped on the sub-carriers 7 and 8.

FIG. 8 discloses an example of an algorithm for determining the shifting parameter for a mobile station according to a third mode of realisation of the present invention.

For example, the present algorithm will be described when it is executed by the processor 200 of the base station BS.

The same algorithm may also be executed by the processor 300 of the mobile station MS when information indicating the clusters of sub-carriers are received for the base station BS by the mobile station MS.

The present algorithm is executed each time clusters of sub-carriers are allocated to a mobile station MS handled by the base station BS.

At step S800, the processor 200 gets the number K of sub-carriers allocated to the mobile station MS.

At next step S801, the processor 200 sets the variable p to null value.

At next step S802, the processor 200 computes a cost function J(p) which is equal to the number of sub-carriers allocated to the mobile station which are paired to a sub-carrier of another cluster using the current value of p as shifting parameter.

At next step S803, the processor 200 computes a variable D(p) which is equal to the maximum distance between two paired sub-carriers.

At next step S804, the processor 200 increments p by two.

At next step S805, the processor 200 checks if p is equal to K. If p is not equal to K, the processor 200 returns to step S802.

The processor 200 checks all the possible values of p with p even.

The processor 200 builds then a table as shown in the FIG. 11.

FIG. 11 represents a table of cost function values and maximum distance values between sub-carriers which are associated.

The table of the FIG. 11 shows the different values of J(p) and D(p) when the sub-carriers allocated to the mobile station MS are as the one disclosed in the FIG. 12.

If p is equal to K, the processor 200 moves from step S805 to step S806.

At step S806, the processor 200 selects the minimum value of J(p) comprised in the table of the FIG. 11.

The minimum value of J(p) is equal to 4.

At next step S807, the processor 200 checks if the minimum value of J(p) is obtained with more than one value of p.

If the minimum value of J(p) is obtained with more than one value of p, the processor 200 moves to step S809. Otherwise, the processor 200 moves to step S808.

At step S808, the processor 200 selects the value of the shifting parameter p as the value of p which corresponds to the minimum value of J(p).

After that, the processor 200 interrupts the present algorithm.

At step S809, the processor 200 selects the value of the shifting parameter p among the values of p which correspond to the minimum value of J(p) as one of the values of p which corresponds to the lowest D(p).

After that, the processor 200 interrupts the present algorithm.

FIG. 12 represents an example of mapping of symbols on sub-carriers according to the third mode of realisation of the present invention.

In the example of the FIG. 12, the frequency band comprises fifteen sub-carriers noted 0 to 14 in the column 1220. Ten of the sub-carriers are allocated to the mobile station MS. The sub-carriers allocated to the mobile station MS are indicated by grey rectangles in the column 1221. The allocated sub-carriers belong to three clusters. The sub-carriers 0 and 1 belong to the cluster $CL_0$, the sub-carriers 3 to 8 belong to the cluster $CL_1$ and the sub-carriers 12 and 13 belong to the cluster $CL_2$.

The line 1200 comprises the sub-carrier 0 on which the couple of symbols ($X_0$, $-X_7^*$) is mapped. The line 1208 comprises the sub-carrier 8 on which the couple of symbols ($X_7$, $X_0^*$) is mapped. Same symbols $X_0$ and $X_7$ are mapped on the sub-carriers 0 and 8, the sub-carriers 0 and 8 are then paired. No impairment exists for the sub-carriers 0 and 8. As no impairment occurs, the decoding of the received symbols $X_0$ and $X_7$ at the receiver side is possible.

The line 1201 comprises the sub-carrier 1 on which the couple of symbols ($X_1$, $X_6^*$) is mapped. The line 1207 comprises the sub-carrier 7 on which the couple of symbols ($X_6$, $-X_1^*$) is mapped. Same symbols $X_1$ and $X_6$ are mapped on the sub-carriers 1 and 7.

The line 1203 comprises the sub-carrier 3 on which the couple of symbols ($X_2$, $-X_5^*$) is mapped. The line 1206 comprises the sub-carrier 6 on which the couple of symbols ($X_5$, $X_2^*$) is mapped. Same symbols $X_2$ and $X_5$ are mapped on the sub-carriers 3 and 6.

The line 1204 comprises the sub-carrier 4 on which the couple of symbols ($X_3$, $X_4^*$) is mapped. The line 1205 comprises the sub-carrier 5 on which the couple of symbols ($X_4$, $-X_3^*$) is mapped. Same symbols $X_3$ and $X_4$ are mapped on the sub-carriers 5 and 6.

The line 1212 comprises the sub-carrier 12 on which the couple of symbols ($X_8$, $-X_9^*$) is mapped. The line 1213 comprises the sub-carrier 13 on which the couple of symbols ($X_8$, $-X_9^*$) is mapped. Same symbols $X_8$ and $X_9$ are mapped on the sub-carriers 12 and 13.

FIG. 13 discloses an example of an algorithm for mapping symbols using the shifting parameter determined according to the present invention.

The present algorithm is executed when symbols are transmitted by the base station BS and/or by the mobile station MS.

The present algorithm will be disclosed when it is executed by the mobile station MS.

At step S1300, the mobile station MS receives information representative of the sub-carriers allocated to the mobile station MS.

At next step S1301, the mobile station MS receives information representative of the shifting parameter p determined for the mobile station MS.

At next step S1302, the symbols to be transferred are mapped on the allocated sub-carriers according to the received shifting parameter and transferred to the base station BS.

FIG. 14 discloses an example of an algorithm for de-mapping symbols using the shifting parameter determined according to the present invention.

The present algorithm is executed when symbols are received by the base station BS and/or by the mobile station MS.

The present algorithm will be disclosed when it is executed by the base station BS.

At step S1400, the processor 300 obtains information representative of the sub-carriers allocated to the mobile station MS the base station BS handles.

At step S1401, the processor 300 obtains information representative of the shifting parameter p determined for the mobile station MS the base station BS handles.

Information representative of the shifting parameter p determined for each mobile station MS the base station BS handles is as the one determined according to the algorithm disclosed in the FIG. 6, 7 or 8.

At next step S1402, the received symbols are de-mapped on the allocated sub-carriers according to the received shifting parameters.

Naturally, many modifications can be made to the embodiments of the invention described above without departing from the scope of the present invention.

The invention claimed is:

1. A method for determining a shifting parameter p to be used by a telecommunication device for mapping symbols on sub-carriers, the method comprising:

allocating sub-carriers to the telecommunication device, the sub-carriers being grouped in at least two clusters, each cluster being separated from another cluster by at least one sub-carrier not allocated to the telecommunication device, wherein the telecommunication device includes at least two transmit antennas, the symbols being transferred through each antenna of the telecommunication device on at least an even number K, strictly greater than two, of sub-carriers allocated to the telecommunication device, the telecommunication device transferring on a first antenna of the telecommunication device during a time slot on each allocated sub-carrier 'k', with k=0 to K−1, a signal representing a symbol '$X_k$' in the frequency domain, and the telecommunication device transferring on a second antenna of the telecommunication device during the time slot, on each allocated sub-carrier 'k', with k=0 to K−1, a signal representing a symbol '$X'_k$' derived from the signal transferred on the first transmit antenna, for each frequency k, by the formula $X'^{secondAnt}_k = \epsilon(-1)^{k+1} X^*_{(p-1-k) \bmod K}$, where $\epsilon$ is 1 or −1, $X^*$ indicating the complex conjugate of X, p-1-k is taken modulo K, K even and p even;

determining the shifting parameter p, the shifting parameter p being determined according to clusters of sub-carriers allocated to the telecommunication device; and determining an equidistant subcarrier which is equally distanced from a first indexed sub-carrier and a last indexed sub-carrier allocated to the telecommunication device and determining the shifting parameter p based on one of two different methods according to whether the equidistant subcarrier is or is not a sub-carrier allocated to the telecommunication device, wherein if the equidistant sub-carrier is a sub-carrier allocated to the telecommunication device, the shifting parameter p is equal to the number of sub-carriers allocated to the telecommunication device and comprised in the first cluster, or is equal to the sum of the number of sub-carriers allocated to the telecommunication device and comprised in at least two clusters.

2. A method according to claim 1, wherein the k-th allocated sub-carrier on which symbols $X_k$ and $X'^k = (-1)^k X^*_{(p-1-k) \bmod K}$ are mapped on first and respectively second transmit antennas, and the (p-1-k)modK-th allocated sub-carrier on which symbols $X_{(p-1-k) \bmod K}$ and $(-1)^{(p-1-k) \bmod K} X^*_k$ are mapped on first and respectively second transmit antennas, are paired and the shifting parameter p is determined so as to minimize the number of sub-carriers between most distanced paired sub-carriers.

3. A method according to claim 1, wherein k-th allocated sub-carrier on which symbols $X_k$ and $X'_k = (-1)^k X^*_{(p-1-k) \bmod K}$ are mapped on first and respectively second transmit antennas, and the (p-1-k)modK-th allocated sub-carrier on which symbols $X_{(p-1-k) \bmod K}$ and $(-1)^{(p-1-k) \bmod K} X^*_k$ are mapped on first and respectively second transmit antennas, are paired and the shifting parameter p is determined so as to minimize the number of sub-carriers paired with sub-carriers mapped in different clusters.

4. A method according to claim 1, further comprising:

computing a cost function J(p) which is equal to the number of sub-carriers allocated to the mobile station which are paired to a sub-carrier of another cluster for each possible value of the shifting parameter; and determining the shifting parameter value p as the value of p which corresponds to the minimum value of J(p).

5. A method according to claim 4, further comprising:

determining the maximum distance between two paired sub-carriers for each possible value of the shifting parameter; and determining the value of the shifting parameter p among the values of p which correspond to the minimum value of J (p) as the value of p which corresponds to the lowest maximum distance between two paired sub-carriers.

6. A method according to claim 1, wherein the method is executed by a base station of a wireless cellular telecommunication network and the telecommunication device is a mobile station handled by the base station.

7. A method according to claim 6, further comprising:

transferring to mobile station information representative of the sub-carriers allocated to the mobile station.

8. A method according to claim 7, further comprising:

transferring information representative of the determined shifting parameter.

9. A method according to claim 8, further comprising:

de-mapping symbols on sub-carriers allocated to the mobile station using the shifting parameter determined for the mobile station.

10. A method according to claim 1, wherein the determination of the shifting parameter p is executed by a mobile station of a wireless cellular telecommunication network.

11. A device for determining a shifting parameter p to be used by a telecommunication device for mapping symbols on sub-carriers, the device for determining a shifting parameter comprising:

means for allocating sub-carriers to the telecommunication device, the sub-carriers being grouped in at least two clusters, each cluster being separated from another cluster by at least one sub-carrier not allocated to the telecommunication device, wherein the telecommunication device includes at least two transmit antennas, the symbols being transferred through each antenna of the telecommunication device on at least an even number K, strictly greater than two, of sub-carriers allocated to the telecommunication device, the telecommunication device transferring on a first antenna of the telecommunication device during a time slot on each allocated sub-carrier 'k', with k=0 to K−1, a signal representing a symbol '$X_k$' in the frequency domain, and the telecommunication device transferring on a second antenna of the telecommunication device during the time slot, on each allocated sub-carrier 'k', with k=0 to K−1, a signal representing a symbol '$X'_k$' derived from the signal transferred on the first transmit antenna, for each frequency k, by the formula $X'^{secondAnt}_k = \epsilon(-1)^{k+1} X^*_{(p-1-k) \bmod K}$, where $\epsilon$ is 1 or −1, $X^*$ indicating the complex conjugate of X, p-1-k is taken modulo K, K even and p even; and means for determining the shifting parameter p, the shifting parameter p being determined according to clusters of sub-carriers allocated to the telecommunication device, wherein the means for determining determines an equidistant subcarrier which is equally distanced from a first indexed sub-carrier and a last indexed sub-carrier allocated to the telecommunication device and determines the shifting parameter p based on one of two different methods according to whether the equidistant subcarrier is or is not a sub-carrier allocated to the telecommunication device, wherein if the equidistant sub-carrier is a sub-carrier allocated to the telecommunication device, the shifting parameter p is equal to the number of sub-carriers allocated to the telecommunication device and comprised in the first cluster, or is equal to the sum of the number of sub-carriers allocated to the telecommunication device and comprised in at least two clusters.

12. A non-transitory computer readable medium that can be directly loadable into a programmable device, comprising computer executable instructions or portions of code for implementing the method according to claim 1, when the computer executable instructions or portions of code are executed on a programmable device.

13. A device for determining a shifting parameter p to be used by a telecommunication device for mapping symbols on sub-carriers, the device for determining a shifting parameter comprising:

circuitry configured to:

allocate sub-carriers to the telecommunication device, the sub-carriers being grouped in at least two clusters, each cluster being separated from another cluster by at least one sub-carrier not allocated to the telecommunication device, wherein the telecommunication device includes at least two transmit antennas, the symbols being transferred through each antenna of the telecommunication device on at least an even number K, strictly greater than two, of sub-carriers allocated to the telecommunication device, the telecommunication device transferring on a first antenna of the telecommunication device during a time slot on each allocated sub-carrier 'k', with k=0 to K−1, a signal representing a symbol '$X_k$' in the frequency domain, and the telecommunication device transferring on a second antenna of the telecommunication device during the time slot, on each allocated sub-carrier 'k', with k=0 to K−1, a signal representing a symbol '$X'_k$' derived from the signal transferred on the first transmit antenna, for each frequency k, by the formula $X'^{secondAnt}_k = \epsilon(-1)^{k+1} X^*_{(p-1-k) \bmod K}$, where $\epsilon$ is 1 or −1, $X^*$ indicating the complex conjugate of X, p-1-k is taken modulo K, K even and p even; and determine the shifting parameter p, the shifting parameter p being determined according to clusters of sub-carriers allocated to the telecommunication device, wherein the circuitry determines an equidistant subcarrier which is equally distanced from a first indexed sub-carrier and a last indexed sub-carrier allocated to the telecommunication device and determines the shifting parameter p based on one of two different methods according to whether the equidistant subcarrier is or is not a sub-carrier allocated to the telecommunication device, and wherein if the equidistant sub-carrier is a sub-carrier allocated to the telecommunication device, the shifting parameter p is equal to the number of sub-carriers allocated to the telecommunication device and comprised in the first cluster, or is equal to the sum of the number of sub-carriers allocated to the telecommunication device and comprised in at least two clusters.

* * * * *